United States Patent
Wang et al.

(10) Patent No.: US 9,736,814 B2
(45) Date of Patent: Aug. 15, 2017

(54) RESOURCE CONFIGURATION METHOD AND APPARATUS

(71) Applicant: Huawei Device Co., Ltd., Shenzhen (CN)

(72) Inventors: Jian Wang, Beijing (CN); Yan Cheng, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 226 days.

(21) Appl. No.: 14/581,218

(22) Filed: Dec. 23, 2014

(65) Prior Publication Data

US 2015/0110056 A1 Apr. 23, 2015

Related U.S. Application Data

(63) Continuation of application No. PCT/CN2013/090943, filed on Dec. 30, 2013.

(30) Foreign Application Priority Data

Jan. 18, 2013 (CN) .......................... 2013 1 0019925

(51) Int. Cl.
*H04W 72/00* (2009.01)
*H04L 5/00* (2006.01)
(Continued)

(52) U.S. Cl.
CPC ......... *H04W 72/005* (2013.01); *H04L 1/0025* (2013.01); *H04L 5/0044* (2013.01);
(Continued)

(58) Field of Classification Search
CPC ... H04W 4/06; H04W 72/04–72/0406; H04W 72/042; H04W 72/121; H04W 72/1273
See application file for complete search history.

(56) References Cited

U.S. PATENT DOCUMENTS

2012/0009947 A1  1/2012  Lee et al.
2012/0257562 A1  10/2012  Kim et al.
(Continued)

FOREIGN PATENT DOCUMENTS

CN   101959136 A   1/2011
CN   102100116 A   6/2011
CN   102202400 A   9/2011

OTHER PUBLICATIONS

Foreign Communication From a Counterpart Application, European Application No. 13871866.3, Extended European Search Report dated Jul. 24, 2015, 6 pages.
(Continued)

*Primary Examiner* — Eric Myers
(74) *Attorney, Agent, or Firm* — Conley Rose, P.C.

(57) ABSTRACT

A resource configuration method includes determining, by a base station, a physical multicast channel (PMCH) resource area and a non-PMCH resource area in a resource of a data frame used for transmitting a multicast or broadcast signal, where the PMCH resource area is used to carry a PMCH, and the non-PMCH resource area is used to carry a physical downlink channel; and sending, by the base station, resource configuration information to a user equipment, where the resource configuration information contains at least one of a resource identifier corresponding to the PMCH resource area and a resource identifier corresponding to the non-PMCH resource area.

24 Claims, 4 Drawing Sheets

(51) Int. Cl.
*H04L 1/00* (2006.01)
*H04L 12/18* (2006.01)
*H04W 72/04* (2009.01)
*H04W 72/12* (2009.01)

(52) U.S. Cl.
CPC .......... *H04L 5/0094* (2013.01); *H04L 1/0003* (2013.01); *H04L 1/0009* (2013.01); *H04L 12/189* (2013.01); *H04L 2001/0093* (2013.01); *H04W 72/042* (2013.01); *H04W 72/121* (2013.01)

(56) References Cited

U.S. PATENT DOCUMENTS

2013/0294317 A1* 11/2013 Malladi ................ H04W 4/06
370/312
2014/0133365 A1   5/2014 Peng et al.
2014/0321394 A1  10/2014 Nogami et al.

OTHER PUBLICATIONS

Foreign Communication From a Counterpart Application, PCT Application No. PCT/CN2013/090943, English Translation of International Search Report dated Apr. 3, 2014, 2 pages.
Foreign Communication From a Counterpart Application, PCT Application No. PCT/CN2013/090943, Written Opinion dated Apr. 3, 2014, 6 pages.

* cited by examiner

RESOURCE CONFIGURATION METHOD AND APPARATUS

CROSS-REFERENCE TO RELATED APPLICATIONS

This application is a continuation of international application number PCT/CN2013/090943, filed on Dec. 30, 2013, which claims priority to Chinese Patent Application No. 201310019925.6, filed on Jan. 18, 2013, both of which are incorporated herein by reference in their entireties.

TECHNICAL FIELD

Embodiments of the present invention relate to communications technologies, and in particular, to a resource configuration method and an apparatus.

BACKGROUND

A multicast or broadcast service is a basic service provided by a 3rd Generation Partnership Project Long Term Evolution (3GPP LTE) system. The 3GPP LTE system carries a multicast or broadcast service of a user terminal using a physical multicast channel (PMCH). The 3GPP LTE system preconfigures, in a data frame, a data subframe that includes the PMCH, and delivers the data subframe to a user equipment (UE) using a broadcast message of the system or using radio resource control (RRC) signaling. The UE acquires the multicast or broadcast service on the data subframe and downlink control signaling according to the received broadcast message or RRC signaling. The data subframe carrying the multicast or broadcast service includes multiple orthogonal frequency division multiplexing (OFDM) symbols, where the PMCH occupies an OFDM symbol in a latter part of the subframe to carry the broadcast/multicast service and occupies all bandwidth, a physical downlink control channel (PDCCH) and a physical hybrid automatic repeat request (HARQ) indicator channel (PHICH) occupy OFDM symbols in a former part of the subframe, the PDCCH is used to carry the downlink control signaling, and the PHICH is used to carry a HACK/negative acknowledgement (NACK) feedback on uplink data transmission.

In an existing LTE system, the subframe carrying the multicast or broadcast service includes the PMCH and the PDCCH. Because the PDCCH occupies all the bandwidth of the subframe, bandwidth of the PMCH overlaps bandwidth of the PDCCH, thereby resulting in interference between the channels.

SUMMARY

Embodiments of the present invention aim to provide a resource configuration method to resolve the problem of interference that exists between channels carrying downlink control signaling of different cells.

According to a first aspect, the present invention provides a resource configuration method, which includes determining, by a base station, a PMCH resource area and a non-PMCH resource area in a frequency domain resource of a data frame used for transmitting a multicast or broadcast signal, where the PMCH resource area is used to transmit a PMCH, and the non-PMCH resource area is used to transmit a physical downlink channel; and sending, by the base station, resource configuration information to a user equipment, where the resource configuration information includes a resource identifier corresponding to at least one of the PMCH resource area and the non-PMCH resource area.

With reference to the first aspect, in a first possible implementation manner of the first aspect, the resource identifier is used to indicate at least one of the following: the number of physical resource block (PRB) pairs that are included in the PMCH resource area and the number of PRB pairs that are included in the non-PMCH resource area; or the resource identifier is used to indicate at least one of the following: the number of resource block groups or resource block pair groups (RBGs) that are included in the PMCH resource area and the number of RBGs that are included in the non-PMCH resource area.

With reference to the first possible implementation manner of the first aspect, in a second possible implementation manner of the first aspect, the resource identifier includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

With reference to the first possible implementation manner of the first aspect, in a third possible implementation manner of the first aspect, the resource identifier includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

With reference to the first possible implementation manner of the first aspect, in a fourth possible implementation manner of the first aspect, the resource identifier includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

With reference to the first aspect or any possible implementation manner of the first possible implementation manner of the first aspect, the second possible implementation manner of the first aspect, the third possible implementation manner of the first aspect, and the fourth possible implementation manner of the first aspect, in a fifth possible implementation manner of the first aspect, the sending, by the base station, resource configuration information to a user equipment includes adding, by the base station, the resource configuration information to RRC signaling or a master information block (MIB) or a system information block (SIB), and sending the RRC signaling or the MIB or the SIB to the user equipment; or adding, by the base station, the resource configuration information to a physical downlink shared channel (PDSCH) channel, and sending the PDSCH to the user equipment.

With reference to the first aspect or any possible implementation manner of the first possible implementation manner of the first aspect, the second possible implementation manner of the first aspect, the third possible implementation manner of the first aspect, the fourth possible implementation manner of the first aspect, and the fifth possible implementation manner of the first aspect, in a sixth possible implementation manner of the first aspect, the resource configuration information further includes information indicating the PMCH; and the information indicating the PMCH includes at least one of the following: a modulation and coding scheme corresponding to the PMCH and an update indicator of a multicast control channel (MCCH) corresponding to the PMCH.

With reference to the sixth possible implementation manner of the first aspect, in a seventh possible implementation manner of the first aspect, before the adding, by the base station, the resource configuration information to a PDSCH, and sending the PDSCH to the user equipment, the method further includes adding, by the base station, information about the PDSCH to RRC signaling or an enhanced physical downlink control channel (EPDCCH), and sending the RRC signaling or the EPDCCH to the user equipment, where the information about the PDSCH includes at least one of the following: a time resource and a frequency resource occupied by the PDSCH, and a modulation and coding scheme.

With reference to the seventh possible implementation manner of the first aspect, in an eighth possible implementation manner of the first aspect, the EPDCCH is scrambled using a set radio network temporary identification (RNTI).

With reference to the seventh possible implementation manner of the first aspect or the eighth possible implementation manner of the first aspect, in a ninth possible implementation manner of the first aspect, a downlink control information format used by the EPDCCH is a two-dimensional (2D) format or a 1A format.

With reference to the first aspect or any possible implementation manner of the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, and the ninth possible implementation manner of the first aspect, in a tenth possible implementation manner of the first aspect, the resource identifier is represented by bits or the resource identifier is represented by a bitmap.

With reference to the first aspect or any possible implementation manner of the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, and the tenth possible implementation manner of the first aspect, in an eleventh possible implementation manner of the first aspect, the physical downlink channel includes any one or more of the following channels: a PDSCH for transmitting downlink data, a channel for transmitting a hybrid automatic repeat request indicator, and a PDCCH for transmitting a downlink control signal.

According to a second aspect, the present invention provides a resource configuration method, which includes receiving, by a user equipment, resource configuration information sent by a base station, where the resource configuration information includes a resource identifier; and determining, by the user equipment, at least one of the following according to the resource identifier: a PMCH resource area and a non-PMCH resource area in a frequency domain resource of a data frame used for transmitting a multicast or broadcast signal, where the PMCH resource area is used to transmit a PMCH, and the non-PMCH resource area is used to transmit a physical downlink channel.

With reference to the second aspect, in a first possible implementation manner of the second aspect, the resource identifier is used to indicate at least one of the following: the number of PRB pairs that are included in the PMCH resource area and the number of PRB pairs that are included in the non-PMCH resource area; or the resource identifier is used to indicate at least one of the following: the number of RBGs that are included in the PMCH resource area and the number of RBGs that are included in the non-PMCH resource area.

With reference to the first possible implementation manner of the second aspect, in a second possible implementation manner of the second aspect, the resource identifier includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

With reference to the first possible implementation manner of the second aspect, in a third possible implementation manner of the second aspect, the resource identifier includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

With reference to the first possible implementation manner of the second aspect, in a fourth possible implementation manner of the second aspect, the resource identifier includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

With reference to the second aspect or any possible implementation manner of the first possible implementation manner of the second aspect, the second possible implementation manner of the second aspect, the third possible implementation manner of the second aspect, and the fourth possible implementation manner of the second aspect, in a fifth possible implementation manner of the second aspect, the receiving, by a user equipment, resource configuration information sent by a base station includes receiving, by the user equipment, RRC signaling or a MIB or a system information block SIB sent by the base station, where the RRC signaling or the MIB or the SIB carries the resource configuration information; or receiving, by the user equipment, a PDSCH sent by the base station, where the PDSCH carries the resource configuration information.

With reference to the second aspect or any possible implementation manner of the first possible implementation manner of the second aspect, the second possible implementation manner of the second aspect, the third possible implementation manner of the second aspect, the fourth possible implementation manner of the second aspect, and the fifth possible implementation manner of the second aspect, in a sixth possible implementation manner of the second aspect, the resource configuration information further includes information indicating the PMCH; and the information indicating the PMCH includes at least one of the following: a modulation and coding scheme corresponding to the PMCH and an update indicator of a MCCH corresponding to the PMCH.

With reference to the sixth possible implementation manner of the second aspect, in a seventh possible implementation manner of the second aspect, before the receiving, by the user equipment, a PDSCH sent by the base station, the method further includes receiving, by the user equipment, RRC signaling or an EPDCCH sent by the base station, where the RRC signaling or the EPDCCH carries information about the PDSCH, and the information about the PDSCH includes at least one of the following: a time resource and a frequency resource occupied by the PDSCH, and a modulation and coding scheme.

With reference to the seventh possible implementation manner of the second aspect, in an eighth possible implementation manner of the second aspect, the EPDCCH is scrambled using a set RNTI.

With reference to the seventh possible implementation manner of the second aspect or the eighth possible implementation manner of the second aspect, in a ninth possible implementation manner of the second aspect, a downlink control information format used by the EPDCCH is a 2D format or a 1A format.

With reference to the second aspect or any possible implementation manner of the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, and the ninth possible implementation manner of the second aspect, in a tenth possible implementation manner of the second aspect, the resource identifier is represented by bits or the resource identifier is represented by a bitmap.

With reference to the second aspect or any possible implementation manner of the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, the ninth possible implementation manner of the second aspect, and the tenth possible implementation manner of the second aspect, in an eleventh possible implementation manner of the second aspect, the physical downlink channel includes any one or more of the following channels: a PDSCH for transmitting downlink data, a channel for transmitting a hybrid automatic repeat request indicator, and a PDCCH for transmitting a downlink control signal.

According to a third aspect, the present invention provides a base station, which includes a processor configured to determine a PMCH resource area and a non-PMCH resource area in a frequency domain resource of a data frame used for transmitting a multicast or broadcast signal, where the PMCH resource area is used to transmit a PMCH, and the non-PMCH resource area is used to transmit a physical downlink channel; and a transmitter configured to send resource configuration information to a user equipment, where the resource configuration information includes a resource identifier corresponding to at least one of the PMCH resource area and the non-PMCH resource area.

With reference to the third aspect, in a first possible implementation manner of the third aspect, the resource identifier that is included in the resource configuration information sent by the transmitter to the user equipment is used to indicate at least one of the following: the number of PRB pairs that are included in the PMCH resource area and the number of PRB pairs that are included in the non-PMCH resource area; or the resource identifier is used to indicate at least one of the following: the number of RBGs that are included in the PMCH resource area and the number of RBGs that are included in the non-PMCH resource area.

With reference to the first possible implementation manner of the third aspect, in a second possible implementation manner of the third aspect, the resource identifier that is included in the resource configuration information sent by the transmitter to the user equipment includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

With reference to the first possible implementation manner of the third aspect, in a third possible implementation manner of the third aspect, the resource identifier that is included in the resource configuration information sent by the transmitter to the user equipment includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

With reference to the first possible implementation manner of the third aspect, in a fourth possible implementation manner of the third aspect, the resource identifier that is included in the resource configuration information sent by the transmitter to the user equipment includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

With reference to the third aspect or any possible implementation manner of the first possible implementation manner of the third aspect, the second possible implementation manner of the third aspect, the third possible implementation manner of the third aspect, and the fourth possible implementation manner of the third aspect, in a fifth possible implementation manner of the third aspect, that the transmitter sends the resource configuration information to the user equipment includes that the base station adds the resource configuration information to RRC signaling or a MIB or a SIB and sends the RRC signaling or the MIB or the SIB to the user equipment; or the base station adds the resource configuration information to a PDSCH and sends the PDSCH to the user equipment.

With reference to the third aspect or any possible implementation manner of the first possible implementation manner of the third aspect, the second possible implementation manner of the third aspect, the third possible implementation manner of the third aspect, the fourth possible implementation manner of the third aspect, and the fifth possible implementation manner of the third aspect, in a sixth possible implementation manner of the third aspect, the resource configuration information sent by the transmitter to the user equipment further includes information indicating the PMCH; and the information indicating the PMCH includes at least one of the following: a modulation and coding scheme corresponding to the PMCH and an update indicator of a MCCH corresponding to the PMCH.

With reference to the sixth possible implementation manner of the third aspect, in a seventh possible implementation manner of the third aspect, before adding the resource configuration information to the PDSCH and sending the PDSCH to the user equipment, the transmitter adds information about the PDSCH to RRC signaling or an EPDCCH and sends the RRC signaling or the EPDCCH to the user equipment, where the information about the PDSCH includes at least one of the following: a time resource and a frequency resource occupied by the PDSCH, and a modulation and coding scheme.

With reference to the seventh possible implementation manner of the third aspect, in an eighth possible implementation manner of the third aspect, the EPDCCH sent by the transmitter to the user equipment is scrambled using a set RNTI.

With reference to the seventh possible implementation manner of the third aspect or the eighth possible implementation manner of the third aspect, in a ninth possible implementation manner of the third aspect, a downlink control information format used by the EPDCCH that is sent by the transmitter to the user equipment is a 2D format or a 1A format.

With reference to the third aspect or any possible implementation manner of the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, and the ninth possible implementation manner of the third aspect, in a tenth possible implementation manner of the third aspect, the resource identifier that is included in the resource configuration information sent by the transmitter to the user equipment is represented by bits or the resource identifier is represented by a bitmap.

With reference to the third aspect or any possible implementation manner of the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, and the tenth possible implementation manner of the third aspect, in an eleventh possible implementation manner of the third aspect, the physical downlink channel includes any one or more of the following channels: a PDSCH for transmitting downlink data, a channel for transmitting a hybrid automatic repeat request indicator, and a PDCCH for transmitting a downlink control signal.

According to a fourth aspect, the present invention provides a user equipment, which includes a receiver configured to receive resource configuration information sent by a base station, where the resource configuration information includes a resource identifier; and a processor configured to determine at least one of the following according to the resource identifier: a PMCH resource area and a non-PMCH resource area in a frequency domain resource of a data frame used for transmitting a multicast or broadcast signal, where the PMCH resource area is used to carry a PMCH, and the non-PMCH resource area is used to carry a physical downlink channel.

With reference to the fourth aspect, in a first possible implementation manner of the fourth aspect, the resource identifier received by the receiver is used to indicate at least one of the following: the number of PRB pairs that are included in the PMCH resource area and the number of PRB pairs that are included in the non-PMCH resource area; or the resource identifier is used to indicate at least one of the following: the number of RBGs that are included in the PMCH resource area and the number of RBGs that are included in the non-PMCH resource area.

With reference to the first possible implementation manner of the fourth aspect, in a second possible implementation manner of the fourth aspect, the resource identifier received by the receiver includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

With reference to the first possible implementation manner of the fourth aspect, in a third possible implementation manner of the fourth aspect, the resource identifier received by the receiver includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

With reference to the first possible implementation manner of the fourth aspect, in a fourth possible implementation manner of the fourth aspect, the resource identifier received by the receiver includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

With reference to the fourth aspect or any possible implementation manner of the first possible implementation manner of the fourth aspect, the second possible implementation manner of the fourth aspect, the third possible implementation manner of the fourth aspect, and the fourth possible implementation manner of the fourth aspect, in a fifth possible implementation manner of the fourth aspect, the resource configuration information received by the receiver includes RRC signaling or a MIB or a SIB, where the RRC signaling or the MIB or the SIB carries the resource configuration information; or a PDSCH, where the PDSCH carries the resource configuration information.

With reference to the fourth aspect or any possible implementation manner of the first possible implementation manner of the fourth aspect, the second possible implementation manner of the fourth aspect, the third possible implementation manner of the fourth aspect, the fourth possible implementation manner of the fourth aspect, and the fifth possible implementation manner of the fourth aspect, in a sixth possible implementation manner of the fourth aspect, the resource configuration information received by the receiver further includes information indicating the PMCH; and the information indicating the PMCH includes at least one of the following: a modulation and coding scheme corresponding to the PMCH and an update indicator of a MCCH corresponding to the PMCH.

With reference to the sixth possible implementation manner of the fourth aspect, in a seventh possible implementation manner of the fourth aspect, before receiving the PDSCH sent by the base station, the receiver receives RRC signaling or an EPDCCH sent by the base station, where the RRC signaling or the EPDCCH carries information about the PDSCH, and the information about the PDSCH includes at least one of the following: a time resource and a frequency resource occupied by the PDSCH, and a modulation and coding scheme.

With reference to the seventh possible implementation manner of the fourth aspect, in an eighth possible implementation manner of the fourth aspect, the EPDCCH received by the receiver is scrambled using a set RNTI.

With reference to the seventh possible implementation manner of the fourth aspect or the eighth possible implementation manner of the fourth aspect, in a ninth possible implementation manner of the fourth aspect, a downlink control information format used by the EPDCCH that is received by the receiver is a 2D format or a 1A format.

With reference to the fourth aspect or any possible implementation manner of the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, and the ninth possible implementation manner of the fourth aspect, in a tenth possible implementation manner of the fourth aspect, the resource identifier received by the receiver is represented by bits or the resource identifier is represented by a bitmap.

With reference to the fourth aspect or any possible implementation manner of the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, the ninth possible implementation manner of the fourth aspect, and the tenth possible implementation manner of the fourth aspect, in an eleventh possible implementation manner of the fourth aspect, the physical downlink channel includes any one or more of the following channels: a PDSCH for transmitting downlink data, a channel for transmitting a hybrid automatic repeat request indicator, and a PDCCH for transmitting a downlink control signal.

According to the resource configuration method and apparatus in the embodiments, a PMCH resource area and a non-PMCH resource area in a resource of a data frame used for carrying and transmitting a multicast or broadcast signal are determined, where the PMCH resource area is used to carry a PMCH, and the non-PMCH resource area is used to carry a physical downlink channel; and resource configuration information is sent to a user equipment, where the resource configuration information includes a resource identifier corresponding to the PMCH resource area and/or the non-PMCH resource area, so that the non-PMCH resource area is distributed on different frequency bands of the resource of the data frame used for carrying and transmitting a multicast or broadcast signal, thereby avoiding interference between channels.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and persons of ordinary skill in the art may still derive other accompanying drawings from these accompanying drawings without creative efforts.

DESCRIPTION OF EMBODIMENTS

To make the objectives, technical solutions, and advantages of the present invention clearer, the following clearly describes the technical solutions in the present invention with reference to the accompanying drawings in the present invention. The described embodiments are some but not all of the embodiments of the present invention. All other embodiments obtained by persons of ordinary skill in the art based on the embodiments of the present invention without creative efforts shall fall within the protection scope of the present invention.

Figure 1:
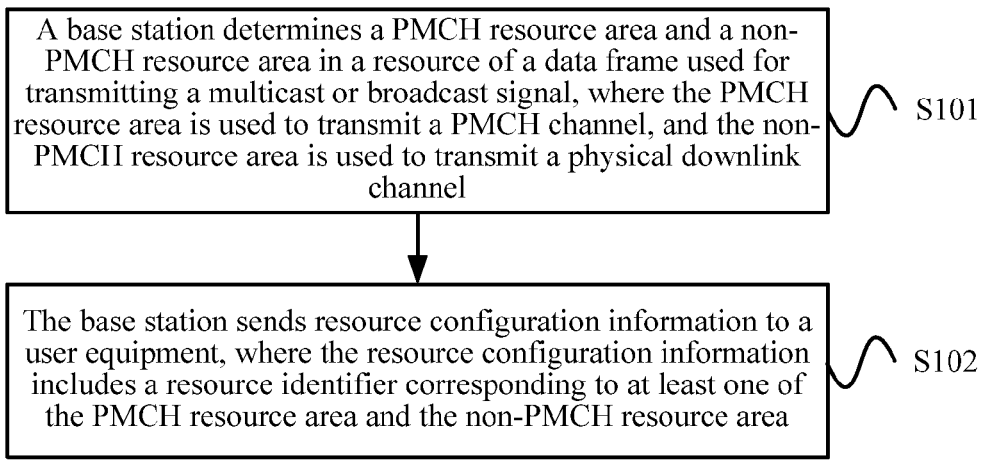
FIG. 1 is a flowchart of Embodiment 1 of a resource configuration method according to the present invention.

FIG. 1 is a flowchart of Embodiment 1 of a resource configuration method according to the present invention. As shown in FIG. 1, the resource configuration method in this embodiment includes the following steps:

S101. A base station determines a PMCH resource area and a non-PMCH resource area in a resource of a data frame used for transmitting a multicast or broadcast signal, where the PMCH resource area is used to transmit a PMCH, and the non-PMCH resource area is used to transmit a physical downlink channel.

The base station may determine, according to a received indication of higher-layer signaling or according to a requirement, how many frequency resources need to be occupied by the PMCH carrying a multicast or broadcast service in the data frame used for transmitting a multicast or broadcast signal, and how many frequency resources need to be occupied by a non-PMCH carrying another service.

For example, system bandwidth is 200 megahertz (MHz), that is, a frequency resource of the data frame used for transmitting a multicast or broadcast signal is 200 MHZ. The base station learns that the PMCH carrying the multicast or broadcast service needs to occupy a frequency resource of 120 MHz and the non-PMCH carrying the another service needs to occupy a frequency resource of 80 MHz Accordingly, the base station allocates a frequency resource of 120 MHz of the data frame for transmitting a multicast or broadcast signal to the PMCH and allocates, to the non-PMCH, the remaining frequency resource of the data frame used for transmitting a multicast or broadcast signal, where the non-PMCH may be used to carry the physical downlink channel.

In this embodiment, the physical downlink channel may be any one or more of the following channels: a PDSCH for transmitting downlink data, a channel for transmitting a hybrid automatic repeat request indicator, and a PDCCH for transmitting a downlink control signal, where the PDSCH for transmitting downlink data may be represented by PDSCH, the channel for transmitting a hybrid automatic repeat request indicator may be represented by PHICH.

S102. The base station sends resource configuration information to a user equipment, where the resource configuration information includes a resource identifier corresponding to at least one of the PMCH resource area and the non-PMCH resource area.

The base station may send the resource configuration information to the user equipment using a MIB or a SIB of a system or using the RRC protocol. The resource configuration information includes a resource identifier corresponding to the PMCH resource area or a resource identifier corresponding to the non-PMCH resource area, where the PMCH resource area and the non-PMCH resource area are included in the resource of the data frame used for transmitting a multicast or broadcast signal, or includes both a resource identifier corresponding to the PMCH resource area and a resource identifier corresponding to the non-PMCH resource area. The user equipment can determine, according to the resource identifier, the PMCH resource area and the non-PMCH resource area of the data frame used for transmitting a multicast or broadcast signal.

According to the resource configuration method in this embodiment, a base station determines a PMCH resource area and a non-PMCH resource area in a resource of a data frame used for transmitting a multicast or broadcast signal, where the PMCH resource area is used to transmit a PMCH, and the non-PMCH resource area is used to transmit a physical downlink channel; and sends resource configuration information to a user equipment, where the resource configuration information includes at least one of the following: a resource identifier corresponding to the PMCH resource area and a resource identifier corresponding to the non-PMCH resource area. In this way, frequency division multiplexing is implemented on the resource of the data frame used for transmitting a multicast or broadcast signal, so that the non-PMCH resource area is distributed on different frequency bands of a frequency domain resource of the data frame used for transmitting a multicast or broadcast signal, thereby avoiding interference between channels.

On the basis of the foregoing embodiment, optionally, the resource identifier is used to indicate at least one of the following: the number of PRB pairs that are included in the PMCH resource area and the number of PRB pairs that are included in the non-PMCH resource area; or the resource identifier is used to indicate at least one of the following: the number of RBGs that are included in the PMCH resource area and the number of RBGs that are included in the non-PMCH resource area.

As a feasible implementation manner, the resource identifier that is included in the resource configuration information sent by the base station to the user equipment may be used to indicate the number of PRB pairs that are occupied by the PMCH resource area, or used to indicate the number of PRB pairs that are occupied by the non-PMCH resource area in the resource of the data frame used for transmitting a multicast or broadcast signal; as another feasible implementation manner, the resource identifier may further be used to indicate the number of PRB pairs that are occupied by the PMCH resource area and the number of PRB pairs that are occupied by the non-PMCH resource area.

As another feasible implementation manner, the resource identifier may be used to indicate the number of RBGs that are occupied by the PMCH resource area, or used to indicate the number of RBGs that are occupied by the non-PMCH resource area in the resource of the data frame used for transmitting a multicast or broadcast signal; as another feasible implementation manner, the resource identifier may further be used to indicate the number of RBGs that are occupied by the PMCH resource area and the number of RBGs that are occupied by the non-PMCH resource area.

It should be noted that if the resource identifier is used to indicate both the PMCH resource area and the non-PMCH resource area, for the PMCH resource area and the non-PMCH resource area, the resource identifier may indicate the number of PRB pairs that are included in the two areas, may also indicate the number of RBGs that are included in the two areas, and may further indicate the number of PRB pairs that are included in one of the two areas and the number of RBGs that are included in the other one of the two areas. That is, the numbers of resources, occupied by the PMCH resource area and the non-PMCH resource area, of the data frame used for transmitting a multicast or broadcast signal may be represented by the number of PRB pairs and may also be represented by the number of RBGs.

When performing frequency resource allocation on a data frame used for carrying and transmitting a multicast or broadcast signal, the base station may use a PRB pair as a unit of a frequency resource, where 1 PRB pair includes 12 subcarriers, and each subcarrier occupies a bandwidth of 15 kilohertz (KHz). In this case, one PRB pair occupies a bandwidth of 180 KHz. For example, if the resource identifier that is included in the resource configuration information sent by the base station to the user equipment indicates that the PMCH resource area occupies a bandwidth of 5 PRB pairs, it indicates that the PMCH occupies a bandwidth of 5 multiplied by 180 KHz in the data frame used for carrying and transmitting a multicast or broadcast signal.

When performing frequency domain resource allocation on the data frame used for carrying and transmitting a multicast or broadcast signal, the base station may also use an RBG as a unit of a frequency domain resource. A size of a frequency domain resource occupied by 1 RBG may be determined according to the system bandwidth, as listed in the following table:

| System bandwidth | Number of RBGs |
| --- | --- |
| ≤10 | 1 |
| 11 - - - 26 | 2 |
| 27 - - - 63 | 3 |
| 64 - - - 110 | 4 |

In the preceding table, when the number of PRB pairs that are included in the system bandwidth is less than or equal to 10, the size of the frequency domain resource occupied by 1 RBG is a size of a frequency domain resource occupied by 1 PRB pair.

When the number of PRB pairs that are included in the system bandwidth is from 11 to 26, the size of the frequency domain resource occupied by 1 RBG is a size of a frequency domain resource occupied by 2 PRB pairs.

When the number of PRB pairs that are included in the system bandwidth is from 27 to 63, the size of the frequency domain resource occupied by 1 RBG is a size of a frequency domain resource occupied by 3 PRB pairs.

When the number of PRB pairs that are included in the system bandwidth is from 64 to 110, the size of the frequency domain resource occupied by 1 RBG is a size of a frequency domain resource occupied by 4 PRB pairs.

On the basis of the foregoing embodiment, optionally, the resource identifier includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of the system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

The resource identifier that is included in the resource configuration information sent by the base station to the user equipment may be the first PMCH identifier, the first non-PMCH identifier, or the first PMCH identifier and the first non-PMCH identifier. A PMCH resource and a non-PMCH resource are in an orthogonal complementary relationship. Therefore, in a case of a given system bandwidth, after a resource occupied by the non-PMCH resource area is determined, a frequency resource except the resource occupied by the non-PMCH resource area is the non-PMCH resource area.

Figure 2:
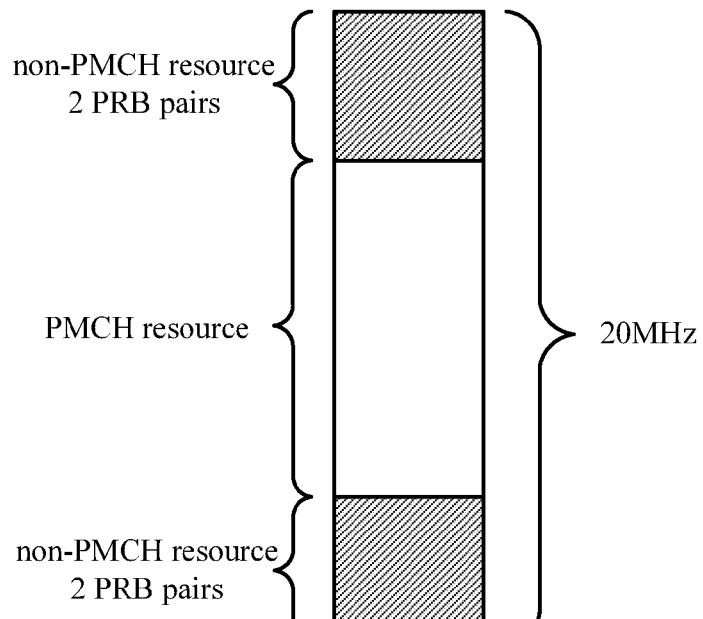
FIG. 2 is Schematic diagram 1 of a resource configuration of a data frame used for transmitting a multicast or broadcast signal according to the present invention.

FIG. 2 is schematic diagram 1 of a resource configuration of a data frame used for transmitting a multicast or broadcast signal according to the present invention. For example, the system bandwidth is 20 MHz, the resource identifier that is included in the resource configuration information sent by the base station to the user equipment is the first non-PMCH identifier, the first non-PMCH identifier is 1, and the first non-PMCH identifier being 1 may be used to indicate that a frequency domain resource occupied by the non-PMCH resource area in the data frame used for transmitting a multicast or broadcast signal is that a frequency domain resource with a size of 1 PRB pair starting from a lowest frequency or a lowest valid frequency in the direction from the lowest frequency to the highest frequency of the system bandwidth is used as the non-PMCH resource area; and a frequency domain resource with the size of 2 PRB pairs starting from a highest frequency or a highest valid frequency in the direction from the highest frequency to the lowest frequency of the system bandwidth is used as the non-PMCH resource area, and the remaining frequency domain resource is used as the PMCH resource area. In this way, the non-PMCH resource area is distributed on different frequency bands of the frequency resource of the data frame used for transmitting a multicast or broadcast signal, and the non-PMCH resource area and the PMCH resource area use, in a frequency division multiplexing manner, the frequency resource of the data frame used for transmitting a multicast or broadcast signal. This can avoid interference between channels. In multicast or broadcast, correspondences between values of the first PMCH identifier and the first non-PMCH identifier and a size of a reserved resource may be preset, and it may also be preset that units of resources that are indicated by the first PMCH identifier and the first non-PMCH identifier are a PRB pair or an RBG. It should be noted that the units of the resources that are indicated by the first PMCH identifier and the first non-PMCH identifier may both be a PRB pair or both be a RBG, or the unit of the resource indicated by one of the first PMCH identifier and the first non-PMCH identifier is a PRB pair, and the unit of the resource indicated by the other one is a RBG.

For another example, the resource identifier that is included in the resource configuration information sent by the base station to the user equipment is the first PMCH identifier and the first non-PMCH identifier, the first PMCH identifier is 1, and the first non-PMCH identifier is 1. According to a presetting, the first non-PMCH identifier 1 is used to indicate that the frequency domain resource occupied by the non-PMCH resource area in the data frame used for transmitting a multicast or broadcast signal is that a frequency domain resource with a size of 1 PRB pair starting from the lowest frequency or the lowest valid frequency in the direction from the lowest frequency to the highest frequency of the system bandwidth is used as the non-PMCH resource area, and a frequency domain resource with the size of 1 PRB pair starting from the highest frequency or the highest valid frequency in the direction from the highest frequency to the lowest frequency of the system bandwidth is used as the non-PMCH resource area; and the first PMCH identifier being 2 is used to indicate that the frequency domain resource occupied by the PMCH resource area in the data frame used for transmitting a multicast or broadcast signal is a frequency domain resource with a size of 2 PRB pairs. The non-PMCH resource area and the PMCH resource area are in an orthogonal complementary relationship, and therefore the frequency domain resource with the size of 2 PRB pairs is a frequency domain resource except the specified non-PMCH resource area in the data frame.

On the basis of the foregoing embodiment, optionally, the resource identifier may include a segment identifier and may further include at least one of the following: a second PMCH identifier and a second non-PMCH identifier; and the segment identifier may be used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

Figure 3:
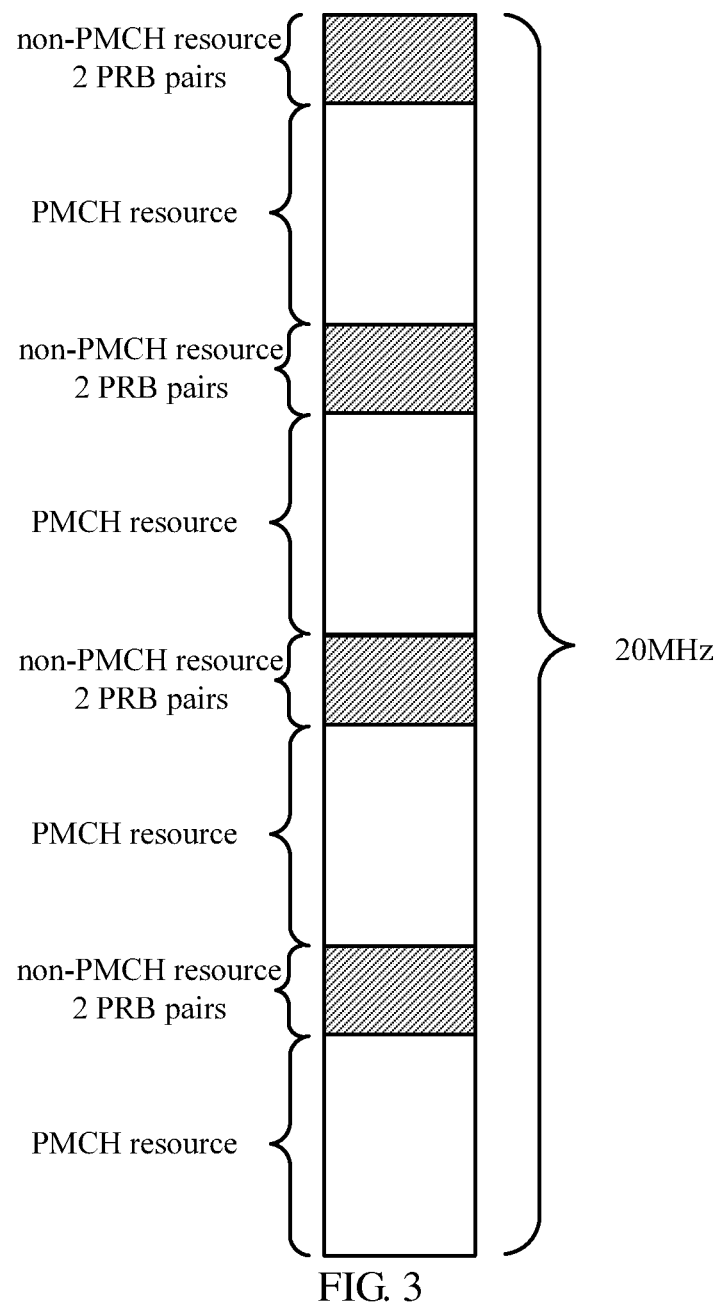
FIG. 3 is Schematic diagram 2 of a resource configuration of a data frame used for transmitting a multicast or broadcast signal according to the present invention.

FIG. 3 is Schematic diagram 2 of a resource configuration of a data frame used for transmitting a multicast or broadcast signal according to the present invention. For example, the system bandwidth is 20 MHz, a unit of the resource identifier is a PRB pair, the segment identifier that is included in the resource configuration information sent by the base station to the user equipment is 4, and the second non-PMCH identifier is 2. In this case, as shown in FIG. 3, the resource of the data frame used for transmitting a multicast or broadcast signal is divided into 4 segments, each of the segments occupies a resource of 5 MHz, a resource with a size of 2 PRB pairs starting from a lowest frequency in a direction from a lowest frequency to a highest frequency of each of the segments, or starting from a highest frequency in a direction from a highest frequency to a lowest frequency of each of the segments is allocated and used as the non-PMCH resource area, and the remaining resource is used as the PMCH resource area. In this way, the non-PMCH resource area may also be distributed on different frequency bands of the frequency resource of the data frame used for transmitting a multicast or broadcast signal, and the non-PMCH resource area and the PMCH resource area use, in a frequency division multiplexing manner, the frequency resource of the data frame used for transmitting a multicast or broadcast signal. This can avoid interference between channels.

For another example, the segment identifier that is included in the resource configuration information sent by the base station to the user equipment is 5, the second PMCH identifier is 8, a unit of the second PMCH identifier is an RBG, the second non-PMCH identifier is 2, and a unit of the second non-PMCH identifier is a PRB pair. In this case, the resource of the data frame used for transmitting a multicast or broadcast signal is divided into 5 segments in total, each of the segments occupies a resource of 4 MHz, a resource with a size of 2 PRB pairs starting from a lowest frequency in a direction from a lowest frequency to a highest frequency of each of the resource segments, or starting from a highest frequency in a direction from a highest frequency to a lowest frequency of each of the segments is allocated and used as the non-PMCH resource area, and then a resource with a size of 8 RBGs is allocated and used as the PMCH resource area. In this way, the non-PMCH resource area may also be distributed on different frequency bands of the frequency resource of the data frame used for transmitting a multicast or broadcast signal, and the non-PMCH resource area and the PMCH resource area use, in a frequency division multiplexing manner, the frequency resource of the data frame used for transmitting a multicast or broadcast signal. This can avoid interference between channels. It should be noted that units of resources that are indicated by the second PMCH identifier and the second non-PMCH identifier may both be a PRB pair or both be a RBG, or a unit of a resource indicated by one of the second PMCH identifier and the second non-PMCH identifier is a PRB pair, and a unit of a resource indicated by the other one is a RBG.

On the basis of the foregoing embodiment, optionally, the resource identifier includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

Figure 4:
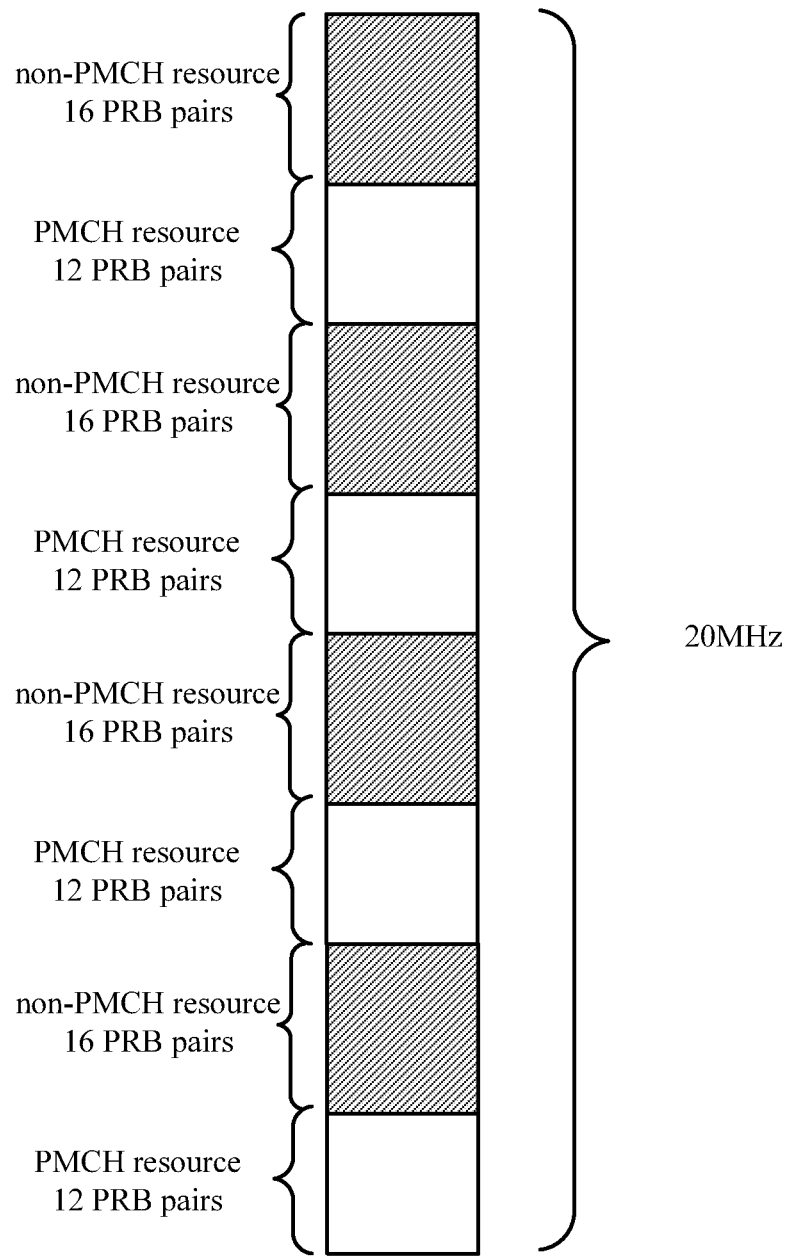
FIG. 4 is Schematic diagram 3 of a resource configuration of a data frame used for transmitting a multicast or broadcast signal according to the present invention.

FIG. 4 is Schematic diagram 3 of a resource configuration of a data frame used for transmitting a multicast or broadcast signal according to the present invention. For example, the system bandwidth is 20 MHz, the resource configuration information sent by the base station to the user equipment includes the third PMCH identifier and the third non-PMCH identifier, the third PMCH identifier is 12, and the third non-PMCH identifier is 16. As shown in FIG. 4, starting from a lowest frequency in a direction from a lowest frequency to a highest frequency of the resource of the data frame used for transmitting a multicast or broadcast signal, a resource with a size of 12 PRB pairs is allocated and used as the PMCH resource area, a resource with a size of 16 PRB pairs is allocated and used as the non-PMCH resource area, and the allocation continues until the resource of the data frame used for transmitting a multicast or broadcast signal is allocated completely. In this way, the non-PMCH resource area may also be distributed on different frequency bands of the frequency resource of the data frame used for transmitting a multicast or broadcast signal, and the non-PMCH resource area and the PMCH resource area use, in a frequency division multiplexing manner, the frequency resource of the data frame used for transmitting a multicast or broadcast signal. This can avoid interference between channels. It should be noted that units of resources that are indicated by the third PMCH identifier and the third non-PMCH identifier may both be a PRB pair or both be a RBG, or a unit of a resource indicated by one of the third PMCH identifier and the third non-PMCH identifier is a PRB pair, and a unit of a resource indicated by the other one is a RBG.

For another example, the resource configuration information sent by the base station to the user equipment includes the third PMCH identifier and the third non-PMCH identifier, the third PMCH identifier is 6, a unit of the third PMCH identifier is an RBG, the third non-PMCH identifier is 16, and a unit of the third non-PMCH identifier is a PRB pair. As shown in FIG. 4, starting from a lowest frequency in a direction from a lowest frequency to a highest frequency of the resource of the data frame used for transmitting a multicast or broadcast signal, a resource with a size of 6 RBGs is allocated and used as the PMCH resource area, a resource with a size of 16 PRB pairs is allocated and used as the non-PMCH resource area, and the allocation continues until the resource of the data frame used for transmitting a multicast or broadcast signal is allocated completely. In this way, the non-PMCH resource area may also be distributed on different frequency bands of the frequency resource of the data frame used for transmitting a multicast or broadcast signal, and the non-PMCH resource area and the PMCH resource area resource use, in a frequency division multiplexing manner, the frequency resource of the data frame used for transmitting a multicast or broadcast signal. This can avoid interference between channels.

On the basis of the foregoing embodiment, optionally, the sending, by the base station, resource configuration information to a user equipment includes adding, by the base station, the resource configuration information to RRC signaling or a MIB or a SIB, and sending the RRC signaling or the MIB or the SIB to the user equipment; or adding, by the base station, the resource configuration information to a PDSCH, and sending the PDSCH to the user equipment.

On the basis of the foregoing embodiment, optionally, the resource configuration information further includes information indicating the PMCH; and the information indicating the PMCH includes at least one of the following: a modulation and coding scheme corresponding to the PMCH and an update indicator of a MCCH corresponding to the PMCH.

It should be noted that the modulation and coding scheme refers to a modulation scheme and a coding scheme. This is because a modulation scheme usually requires a corresponding coding scheme.

The information that indicates the PMCH and is carried in the PDSCH sent by the base station to the user equipment may include any one or more of the following: frequency domain resource information corresponding to the PMCH, the modulation and coding scheme corresponding to the PMCH, and information indicating the update indicator of the MCCH corresponding to the PMCH. The frequency domain resource information corresponding to the PMCH may be information indicating a start position of a frequency domain of a PRB pair on which the PMCH resource area is located and indicating the number of included PRB pairs, and the modulation and coding scheme corresponding to the PMCH may refer to a modulation scheme and a coding scheme that corresponds to the PMCH.

On the basis of the foregoing embodiment, optionally, before the adding, by the base station, the resource configuration information to a PDSCH, and sending the PDSCH to the user equipment, the method further includes adding, by the base station, information about the PDSCH to RRC signaling or an EPDCCH, and sending the RRC signaling or the EPDCCH to the user equipment, where the information about the PDSCH includes at least one of the following: a time resource and a frequency resource occupied by the PDSCH, and a modulation and coding scheme.

Before sending the PDSCH to the user equipment, the base station may further add the information about the PDSCH to the RRC signaling or the EPDCCH and send the RRC signaling or the EPDCCH to the user equipment, where the EPDCCH may be scrambled using a set RNTI, and a downlink control information format used by the EPDCCH may be a 2D format or a 1A format and may further be another format introduced in a standard.

On the basis of the foregoing embodiment, still further, the resource identifier may be represented by bits, or the resource identifier may be represented by a bitmap.

The resource identifier that is included in the resource configuration information sent by the base station to the user equipment may be identified by bits. For example, the base station may use 2 bits to represent the resource identifier, and may also set that the 2 bits being 00 represents that a value of the resource identifier is 2, the 2 bits being 01 represents that the value of the resource identifier is 4, the 2 bits being 10 represents that the value of the resource identifier is 8, and the 2 bits being 11 represents that the value of the resource identifier is 16. Alternatively, the resource identifier that is included in the resource configuration information sent by the base station to the user equipment may be represented by a bitmap, where digits 0 and 1 in the bitmap are mapped to the non-PMCH resource area and the PMCH resource area respectively. For example, the bitmap is 00000111111111000111111111111100000111111111, and accordingly, starting from one side of the resource of the data frame used for transmitting a multicast or broadcast signal, 5 PRB pairs or RBGs are allocated and used as the non-PMCH resource area, 9 PRB pairs or RBGs are allocated and used as the PMCH resource area, 3 PRB pairs or RBGs are allocated and used as the non-PMCH resource area, 12 PRB pairs or RBGs are allocated and used as the PMCH resource area, 5 PRB pairs or RBGs are allocated and used as the non-PMCH resource area, and then 9 PRB pairs or RBGs are allocated and used as the PMCH resource area.

Figure 5:
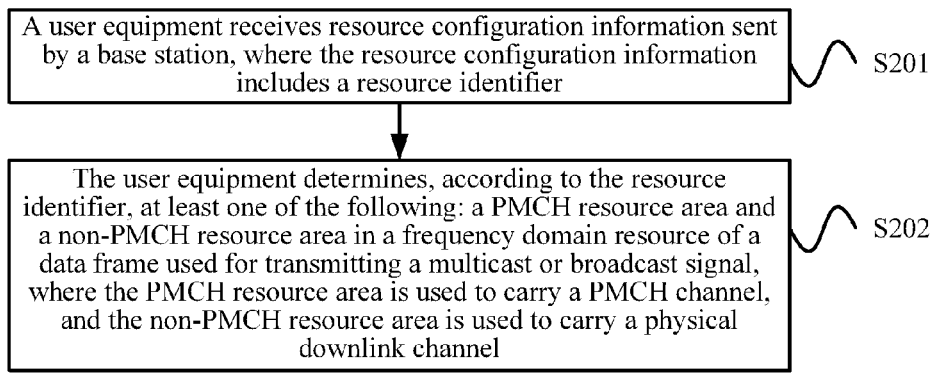
FIG. 5 is a flowchart of Embodiment 2 of a resource configuration method according to the present invention.

FIG. 5 is a flowchart of Embodiment 2 of a resource configuration method according to the present invention. As shown in FIG. 5, the resource configuration method in this embodiment includes the following steps:

S201. A user equipment receives resource configuration information sent by a base station, where the resource configuration information includes a resource identifier.

The user equipment may receive, using a MIB or a SIB in a broadcast message of a system or using the RRC, the resource configuration information sent by the base station, where the resource configuration information includes the resource identifier, and the user equipment may determine, according to the resource identifier, a PMCH resource area and a non-PMCH resource area in a data frame used for transmitting a multicast or broadcast signal.

S202. The user equipment determines, according to the resource identifier, at least one of the following: a PMCH resource area and a non-PMCH resource area in a frequency domain resource of a data frame used for transmitting a multicast or broadcast signal, where the PMCH resource area is used to carry a PMCH, and the non-PMCH resource area is used to carry a physical downlink channel.

The user equipment may determine, according to the resource identifier, the PMCH resource area in the resource of the data frame used for transmitting a multicast or broadcast signal, and may determine, according to the resource identifier, the non-PMCH resource area of the PMCH in the resource of the data frame used for transmitting a multicast or broadcast signal, where the PMCH resource area may be determined according to the non-PMCH resource area because the PMCH resource area and the non-PMCH resource area are in an orthogonal complementary relationship. Alternatively, the user equipment may determine, according to the resource identifier, the non-PMCH resource area of the PMCH in the resource of the data frame used for transmitting a multicast or broadcast signal, and the PMCH resource area may also be determined according to the non-PMCH resource area because the PMCH resource area and the non-PMCH resource area are in an orthogonal complementary relationship. Alternatively, the user equipment may determine, according to the resource identifier, the non-PMCH resource area and the PMCH resource area of the PMCH in the resource of the data frame used for transmitting a multicast or broadcast signal.

In this embodiment, the physical downlink channel may be one of the following or a combination of more of the following: a PDSCH for transmitting downlink data, a channel for transmitting a hybrid automatic repeat request indicator, or a PDCCH for transmitting a downlink control signal, where the PDSCH for transmitting downlink data may be represented by PDSCH, the channel for transmitting a hybrid automatic repeat request indicator may be represented by PHICH.

According to the resource configuration method in this embodiment, resource configuration information sent by a base station is received, where the resource configuration information includes a resource identifier; and at least one of the following is determined according to the resource identifier: a PMCH resource area and a non-PMCH resource area in a resource of a data frame used for transmitting a multicast or broadcast signal, where the PMCH resource area is used to carry a PMCH, and the non-PMCH resource area is used to carry a physical downlink channel. In this way, frequency division multiplexing is implemented on the resource of the data frame used for transmitting a multicast or broadcast signal, so that the non-PMCH resource area is distributed on different frequency bands of the resource of the data frame used for carrying and transmitting a multicast or broadcast signal, thereby avoiding interference between channels.

On the basis of the foregoing embodiment, optionally, the resource identifier may be used to indicate at least one of the following: the number of PRB pairs that are included in the PMCH resource area and the number of PRB pairs that are included in the non-PMCH resource area; or the resource identifier is used to indicate at least one of the following: the number of RBGs that are included in the PMCH resource area and the number of RBGs that are included in the non-PMCH resource area.

The resource configuration information that is sent by the base station to the user equipment and received by the user equipment includes the resource identifier, and the user equipment may learn, according to the resource identifier, the number of PRB pairs or RBGs that are occupied by the PMCH resource area and the number of PRB pairs or RBGs that are occupied by the non-PMCH resource area in the resource of the data frame used for transmitting a multicast or broadcast signal.

On the basis of the foregoing embodiment, optionally, the resource identifier may include at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

For example, the resource configuration information that is sent by the base station and received by the user equipment includes the first PMCH identifier and the first non-PMCH identifier, the first PMCH identifier is 2, and the first non-PMCH identifier is 1. According to a presetting, the first non-PMCH identifier 1 is used to indicate that a frequency domain resource occupied by the non-PMCH resource area in the data frame used for transmitting a multicast or broadcast signal is that a frequency domain resource with a size of 1 PRB pair starting from a lowest frequency or a lowest valid frequency in the direction from the lowest frequency to the highest frequency of the system bandwidth is used as the non-PMCH resource area, and a frequency domain resource with a size of 1 PRB pair starting from a highest frequency or a highest valid frequency in the direction from the highest frequency to the lowest frequency of the system bandwidth is used as the non-PMCH resource area; and the first PMCH identifier being 2 is used to indicate that a frequency domain resource occupied by the PMCH resource area in the data frame used for transmitting a multicast or broadcast signal is a frequency domain resource with a size of 2 PRB pairs. The non-PMCH resource area and the PMCH resource area are in an orthogonal complementary relationship, and therefore the frequency domain resource with the size of 2 PRB pairs is a frequency domain resource except the specified non-PMCH resource area in the data frame.

On the basis of the foregoing embodiment, optionally, the resource identifier may include a segment identifier and may further include at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

For example, the segment identifier included in the resource configuration information that is sent by the base station and received by the user equipment is 4, and the second non-PMCH identifier is 2. In this case, the user equipment may determine that the resource of the data frame used for transmitting a multicast or broadcast signal is divided into 4 segments in total, each of the segments occupies a resource of 5 MHz, a resource with a size of 2 PRBs starting from a lowest frequency in a direction from a lowest frequency to a highest frequency of each of the segments, or starting from a highest frequency in a direction from a highest frequency to a lowest frequency of each of the segments is allocated and used as the non-PMCH resource area, and the remaining resource is used as the PMCH resource area.

For another example, the segment identifier included in the resource configuration information that is sent by the base station and received by the user equipment is 5, the second PMCH identifier is 8, a unit of the second PMCH identifier is an RBG, the second non-PMCH identifier is 2, and a unit of the second non-PMCH identifier is a PRB pair. The user equipment may learn, according to the resource configuration information, that the resource of the data frame used for transmitting a multicast or broadcast signal is divided into 5 segments in total, each of the segments occupies a resource of 4 MHz, a resource with a size of 2 PRBs starting from a lowest frequency in a direction from a lowest frequency to a highest frequency of each of the resource segments, or starting from a highest frequency in a direction from a highest frequency to a lowest frequency of each of the segments is allocated and used as the non-PMCH resource area, and then a resource with a size of 8 RBGs is allocated and used as the PMCH resource area.

On the basis of the foregoing embodiment, optionally, the resource identifier may include at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

For example, the resource configuration information that is sent by the base station and received by the user equipment includes the third PMCH identifier and the third non-PMCH identifier, the third PMCH identifier is 12, and the third non-PMCH identifier is 16. The user equipment may learn, according to the resource configuration information, that in the resource of the data frame used for transmitting a multicast or broadcast signal, starting from a lowest frequency in a direction from a lowest frequency to a highest frequency of the resource of the data frame, a resource with a size of 12 PRB pairs is the PMCH resource area, a resource with a size of 16 PRB pairs is the non-PMCH resource area, a resource with a size of 12 PRB pairs is the PMCH resource area, a resource with a size of 16 PRB pairs is the non-PMCH resource area, and the allocation continues until the resource of the data frame used for transmitting a multicast or broadcast signal is allocated completely.

For another example, the resource configuration information sent by the base station to the user equipment includes the third PMCH identifier and the third non-PMCH identifier, the third PMCH identifier is 6, a unit of the third PMCH identifier is an RBG, the third non-PMCH identifier is 16, and a unit of the third non-PMCH identifier is a PRB pair. The user equipment may learn, according to the resource configuration information, that in the data frame used for transmitting a multicast or broadcast signal, starting from a lowest frequency in a direction from a lowest frequency to a highest frequency of the resource of the data frame, a resource with a size of 6 RBGs is the PMCH resource area, a resource with a size of 16 PRB pairs is the non-PMCH resource area, a resource with a size of 6 RBGs is the PMCH resource area, a resource with a size of 16 PRB pairs is the non-PMCH resource area, and the allocation continues until the resource of the data frame used for transmitting a multicast or broadcast signal is allocated completely.

On the basis of the foregoing embodiment, further, the receiving, by a user equipment, resource configuration information sent by a base station includes receiving, by the user equipment, RRC signaling or a MIB or a SIB sent by the base station, where the RRC signaling or the MIB or the SIB carries the resource configuration information; or receiving, by the user equipment, a PDSCH sent by the base station, where the PDSCH carries the resource configuration information.

On the basis of the foregoing embodiment, still further, the resource configuration information further includes information indicating the PMCH; and the information indicating the PMCH includes at least one of the following: a modulation and coding scheme corresponding to the PMCH and an update indicator of a MCCH corresponding to the PMCH.

The information that indicates the PMCH and is carried in the PDSCH received by the user equipment may include any one or more of the following: frequency domain resource information corresponding to the PMCH, the modulation and coding scheme corresponding to the PMCH, and information indicating the update indicator of the MCCH corresponding to the PMCH. The frequency domain resource information corresponding to the PMCH may be information indicating a start position of a frequency domain of a pair on which the PMCH resource area is located and indicating the number of included PRB pairs, and the modulation and coding scheme corresponding to the PMCH may refer to a modulation scheme and a coding scheme that correspond to the PMCH.

On the basis of the foregoing embodiment, still further, before the receiving, by the user equipment, a PDSCH sent by the base station, the method further includes receiving, by the user equipment, RRC signaling or an EPDCCH sent by the base station, where the RRC signaling or the EPDCCH carries information about the PDSCH, and the information about the PDSCH includes at least one of the following: a time resource and a frequency resource occupied by the PDSCH, and a modulation and coding scheme.

The user equipment may detect, in search space corresponding to an EPDCCH, an EPDCCH scrambled using a specified RNTI, and if the EPDCCH scrambled using the specified RNTI is detected, a PDSCH indicated by the EPDCCH carries information indicating PMCH transmission, where the specified RNTI may be a RNTI, the search space corresponding to the EPDCCH may be common search space (CSS) of the EPDCCH and may also be dedicated search space, which is not limited herein, and a downlink control information (DCI) format used by the EPDCCH may be a 2D DCI format, may also be a 1A DCI format, or may further be another DCI format introduced in a standard.

The user equipment acquires, according to DCI information carried in the corresponding DCI format in the detected EPDCCH, a resource carrying the PDSCH, where the resource of the PDSCH may include a location of a PRB pair on which the PDSCH is located and a modulation and coding scheme of the PDSCH, and performs decoding on the PDSCH according to the information, so as to acquire information indicating the PMCH resource area and the non-PMCH resource area in the resource of the data frame used for transmitting a multicast or broadcast signal.

On the basis of the foregoing embodiment, still further, the resource identifier may be represented by bits, or the resource identifier may be represented by a bitmap.

The resource identifier included in the resource configuration information that is sent by the base station to the user equipment and received by the user equipment may be in a form of bits and may also be in a form of a bitmap.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Figure 6:
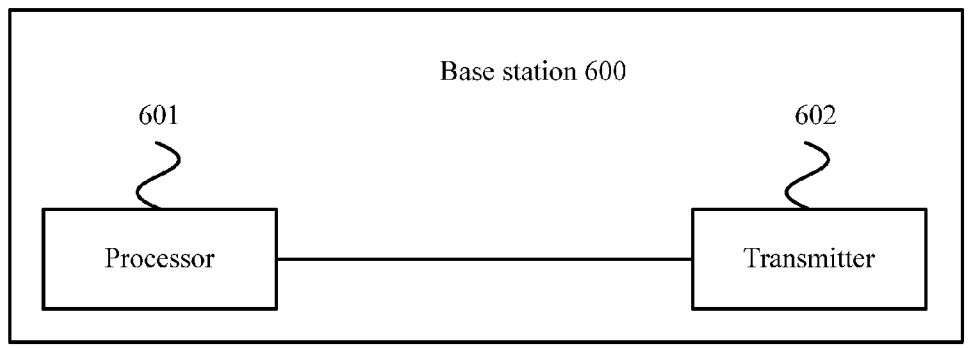
FIG. 6 is a Schematic diagram of Embodiment 1 of a base station according to the present invention.

FIG. 6 is a flowchart of Embodiment 1 of a base station according to the present invention. As shown in FIG. 6, a base station 600 in this embodiment includes a processor 601 and a transmitter 602. The processor 601 is configured to determine a PMCH resource area and a non-PMCH resource area in a frequency domain resource of a data frame used for transmitting a multicast or broadcast signal, where the PMCH resource area is used to transmit a PMCH, and the non-PMCH resource area is used to transmit a physical downlink channel; and the transmitter 602 is configured to send resource configuration information to a user equipment, where the resource configuration information includes a resource identifier corresponding to at least one of the PMCH resource area and the non-PMCH resource area.

The base station in this embodiment may be configured to execute the method in Embodiment 1 of the resource configuration method, where steps that are performed are similar to those in Embodiment 1 of the resource configuration method, reference may be made to Embodiment 1 of the resource configuration method, and details are not described herein again.

According to the base station in this embodiment, a processor determines a PMCH resource area and a non-PMCH resource area in a frequency domain resource of a data frame used for transmitting a multicast or broadcast signal; and a transmitter sends resource configuration information to a user equipment, where the resource configuration information contains a resource identifier corresponding to at least one of the PMCH resource area and the non-PMCH resource area. In this way, frequency division multiplexing is implemented on the frequency domain resource of the data frame used for transmitting a multicast or broadcast signal, so that the non-PMCH resource area is distributed on different frequency bands of the resource of the data frame used for transmitting a multicast or broadcast signal, thereby avoiding interference between channels.

On the basis of the foregoing embodiment, the resource identifier that is included in the resource configuration information sent by the transmitter to the user equipment is used to indicate at least one of the following: the number of PRB pairs that are included in the PMCH resource area and the number of PRB pairs that are included in the non-PMCH resource area, or the resource identifier is used to indicate at least one of the following: the number of RBGs that are included in the PMCH resource area and the number of RBGs that are included in the non-PMCH resource area.

On the basis of the foregoing embodiment, the resource identifier that is included in the resource configuration information sent by the transmitter to the user equipment includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

On the basis of the foregoing embodiment, the resource identifier that is included in the resource configuration information sent by the transmitter to the user equipment includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

On the basis of the foregoing embodiment, the resource identifier that is included in the resource configuration information sent by the transmitter to the user equipment includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

On the basis of the foregoing embodiment, that the transmitter sends the resource configuration information to the user equipment includes that the transmitter adds the resource configuration information to RRC signaling or a MIB or a SIB and sends the RRC signaling or the MIB or the SIB to the user equipment, or that the transmitter adds the resource configuration information to a PDSCH and sends the PDSCH to the user equipment.

On the basis of the foregoing embodiment, the resource configuration information sent by the transmitter to the user equipment further includes information indicating the PMCH; and the information indicating the PMCH includes at least one of the following: a modulation and coding scheme corresponding to the PMCH and an update indicator of a MCCH corresponding to the PMCH.

On the basis of the foregoing embodiment, before adding the resource configuration information to the PDSCH and sending the PDSCH to the user equipment, the transmitter adds information about the PDSCH to RRC signaling or an EPDCCH and sends the RRC signaling or the EPDCCH to the user equipment, where the information about the PDSCH includes at least one of the following: a time resource and a frequency resource occupied by the PDSCH, and a modulation and coding scheme.

On the basis of the foregoing embodiment, the EPDCCH sent by the transmitter to the user equipment is scrambled using a set RNTI.

On the basis of the foregoing embodiment, a downlink control information format used by the EPDCCH that is sent by the transmitter to the user equipment is a 2D format or a 1A format.

On the basis of the foregoing embodiment, the resource identifier that is included in the resource configuration information sent by the transmitter to the user equipment is represented by bits, or the resource identifier is represented by a bitmap.

On the basis of the foregoing embodiment, the physical downlink channel includes any one or more of the following channels: a PDSCH for transmitting downlink data, a channel for transmitting a hybrid automatic repeat request indicator, and a PDCCH for transmitting a downlink control signal.

Figure 7:
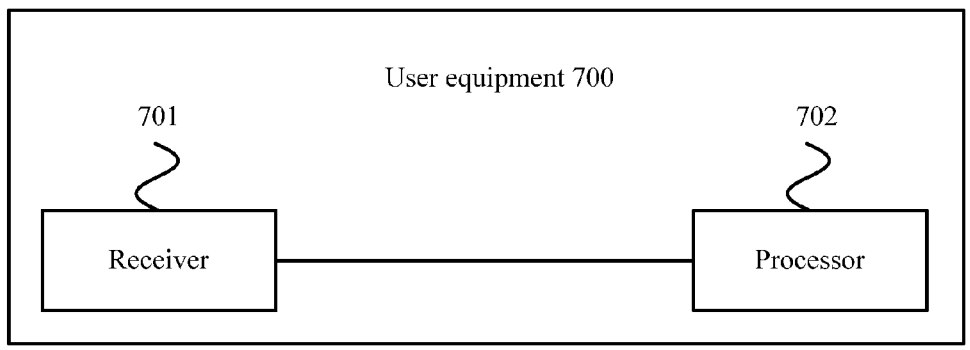
FIG. 7 is a Schematic diagram of Embodiment 1 of a user equipment according to the present invention.

FIG. 7 is a flowchart of Embodiment 1 of a user equipment according to the present invention. As shown in FIG. 7, a user equipment 700 in this embodiment includes a receiver 701 and a processor 702. The receiver 701 may be configured to receive resource configuration information sent by a base station, where the resource configuration information includes a resource identifier; and the processor 702 may be configured to determine at least one of the following according to the resource identifier: a PMCH resource area and a non-PMCH resource area in a frequency domain resource of a data frame used for transmitting a multicast or broadcast signal, where the PMCH resource area is used to carry a PMCH, and the non-PMCH resource area is used to carry a physical downlink channel.

The user equipment in this embodiment may be configured to execute the method in Embodiment 2 of the resource configuration method, where steps that are performed are similar to those in Embodiment 2 of the resource configuration method, reference may be made to Embodiment 2 of the resource configuration method, and details are not described herein again.

According to the user equipment in this embodiment, a receiver receives resource configuration information sent by a base station, where the resource configuration information includes a resource identifier; and a processor determines, according to the resource identifier, at least one of the following: a PMCH resource area and a non-PMCH resource area in a frequency domain resource of a data frame used for transmitting a multicast or broadcast signal. In this way, frequency division multiplexing is implemented on a resource of the data frame used for transmitting a multicast or broadcast signal, so that the non-PMCH resource area is distributed on different frequency bands of the resource of the data frame used for transmitting a multicast or broadcast signal, thereby avoiding interference between channels.

On the basis of the foregoing embodiment, the resource identifier received by the receiver is used to indicate at least one of the following: the number of PRB pairs that are included in the PMCH resource area and the number of PRB pairs that are included in the non-PMCH resource area, or the resource identifier is used to indicate at least one of the following: the number of RBGs that are included in the PMCH resource area and the number of RBGs that are included in the non-PMCH resource area.

On the basis of the foregoing embodiment, the resource identifier received by the receiver includes at least one of the following: a first PMCH identifier and a first non-PMCH identifier; the first PMCH identifier is used to indicate the number of PRB pairs or physical RBGs that are included in the PMCH resource area in a direction from a lowest frequency to a highest frequency of system bandwidth and the number of PRB pairs or physical RBGs that are included in the PMCH resource area in a direction from the highest frequency to the lowest frequency; and the first non-PMCH identifier is used to indicate the number of PRB pairs or RBGs that are included in the PMCH resource area in the direction from the lowest frequency to the highest frequency of the system bandwidth and the number of PRB pairs or RBGs that are included in the PMCH resource area in the direction from the highest frequency to the lowest frequency.

On the basis of the foregoing embodiment, the resource identifier received by the receiver includes a segment identifier and further includes at least one of the following: a second PMCH identifier and a second non-PMCH identifier; and the segment identifier is used to indicate the number of segments into which the resource of the data frame used for transmitting a multicast or broadcast signal is divided, the second PMCH identifier is used to indicate the number of PRB pairs or RBGs, in each of the segments, that belong to the PMCH resource area, and the second non-PMCH identifier is used to indicate the number of PRB pairs or RBGs, in each of the segments, that belong to the non-PMCH resource area.

On the basis of the foregoing embodiment, the resource identifier received by the receiver includes at least one of the following: a third PMCH identifier and a third non-PMCH identifier; and the third PMCH identifier is used to indicate the number of PRB pairs or RBGs that are included in a sub-area of the PMCH resource area, where the sub-area of the PMCH resource area and a sub-area of the non-PMCH resource area are alternately set, and the third non-PMCH identifier is used to indicate the number of PRB pairs or RBGs that are included in the sub-area of the non-PMCH resource area, where the sub-area of the non-PMCH resource area and the sub-area of the PMCH resource area are alternately set.

On the basis of the foregoing embodiment, the resource configuration information received by the receiver includes RRC signaling or a MIB or a SIB, where the RRC signaling or the MIB or the SIB carries the resource configuration information; or a PDSCH, where the PDSCH carries the resource configuration information.

On the basis of the foregoing embodiment, the resource configuration information received by the receiver further includes information indicating the PMCH; and the information indicating the PMCH includes at least one of the following: a modulation and coding scheme corresponding to the PMCH and an update indicator of a MCCH corresponding to the PMCH.

On the basis of the foregoing embodiment, before receiving the PDSCH sent by the base station, the receiver receives RRC signaling or an EPDCCH sent by the base station, where the RRC signaling or the EPDCCH carries information about the PDSCH, and the information about the PDSCH includes at least one of the following: a time resource and frequency resource occupied by the PDSCH, and a modulation and coding scheme.

On the basis of the foregoing embodiment, the EPDCCH received by the receiver is scrambled using a set RNTI.

On the basis of the foregoing embodiment, a downlink control information format used by the EPDCCH that is received by the receiver is a 2D format or a 1A format.

On the basis of the foregoing embodiment, the resource identifier received by the receiver is represented by bits, or the resource identifier is represented by a bitmap.

On the basis of the foregoing embodiment, the physical downlink channel includes any one or more of the following channels: a PDSCH for transmitting downlink data, a channel for transmitting a hybrid automatic repeat request indicator, and a PDCCH for transmitting a downlink control signal.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A resource configuration method comprising:
   determining, by a base station, a physical multicast channel (PMCH) resource area and a non-PMCH resource area in a frequency domain resource of a data frame used for transmitting a multicast or broadcast signal, wherein the PMCH resource area is used to transmit a PMCH, and the non-PMCH resource area is used to transmit a physical downlink channel; and
   sending, by the base station, resource configuration information to a user equipment, wherein the resource configuration information comprises a resource identifier corresponding to at least one of the PMCH resource area and/or the non-PMCH resource area, and
   wherein the resource identifier is used to indicate at least one of the following: a PMCH physical resource block (PRB) pairs number indicating a total number of PRB pairs that are part of the PMCH resource area, a non-PMCH PRB number indicating a total number of PRB pairs that are part of the non-PMCH resource area, a PMCH resource block groups (RBGs) number indicating a total number of RBGs that are part of the PMCH resource area, or a non-PMCH RBGs number indicating a total number of RBGs that are part of the non-PMCH resource area; and
   wherein the resource identifier comprises at least one of the following: a first PMCH identifier or a first non-PMCH identifier, wherein the first PMCH identifier is used to indicate the number of PRB pairs or physical RBGs that are part of the PMCH resource area in a direction from a lowest frequency to a highest frequency of system bandwidth and the number of PRB pairs or physical RBGs that are part of the PMCH resource area in a direction from the highest frequency to the lowest frequency, and wherein the first non-PMCH identifier is used to indicate the number of PRB pairs or RBGs that are part of the non-PMCH resource area in the direction from the lowest frequency to the highest frequency of the system bandwidth and the number of PRB pairs or RBGs that are part of the non-PMCH resource area in the direction from the highest frequency to the lowest frequency.

2. The method according to claim 1, wherein sending the resource configuration information to the user equipment comprises:
   adding, by the base station, the resource configuration information to a physical downlink shared channel (PDSCH); and
   sending the PDSCH to the user equipment.

3. The method according to claim 2, wherein before adding the resource configuration information to the PDSCH and sending the PDSCH to the user equipment, the method further comprises:
   adding, by the base station, information about the PDSCH to radio resource control (RRC) signaling or an enhanced physical downlink control channel (EPDCCH); and
   sending the RRC signaling or the EPDCCH to the user equipment, and
   wherein the information about the PDSCH comprises at least one of the following:
      a time resource and a frequency resource occupied by the PDSCH; or
      a modulation and coding scheme corresponding to the PDSCH.

4. The method according to claim 1, wherein the resource configuration information further comprises information indicating the PMCH, and wherein the information indicating the PMCH comprises at least one of the following: a modulation and coding scheme corresponding to the PMCH or an update indicator of a multicast control channel MCCH corresponding to the PMCH.

5. The method according to claim 1, wherein the physical downlink channel comprises one or more of the following channels: a physical downlink shared channel (PDSCH) for transmitting downlink data, a channel for transmitting a hybrid automatic repeat request indicator, or a physical downlink control channel (PDCCH) for transmitting a downlink control signal.

6. The method according to claim 1, wherein sending the resource configuration information to the user equipment comprises:
   adding, by the base station, the resource configuration information to radio resource control (RRC) signaling, a raster information block (MIB), or a system information block (SIB); and
   sending the RRC signaling or the MIB or the SIB to the user equipment.

7. A resource configuration method comprising:
   receiving, by a user equipment, resource configuration information sent by a base station, wherein the resource configuration information comprises a resource identifier; and
   determining, by the user equipment, at least one of the following according to the resource identifier: a physical multicast channel (PMCH) resource area or a non-PMCH resource area in a frequency domain resource of a data frame used for transmitting a multicast or broadcast signal, wherein the PMCH resource area is used to transmit a PMCH, wherein the non-PMCH resource area is used to transmit a physical downlink channel, and wherein the resource identifier is used to indicate at least one of the following: a PMCH physical resource block (PRB) pairs number indicating a total number of PRB pairs that are part of the PMCH resource area, a non-PMCH PRB number indicating a total number of PRB pairs that are part of the non-PMCH resource area, a PMCH resource block groups (RBGs) number indicating a total number of RBGs that are part of the PMCH resource area, or a non-PMCH RBGs number indicating a total number of RBGs that are part of the non-PMCH resource area; and wherein the resource identifier comprises at least one of the following: a first PMCH identifier or a first non-PMCH identifier, wherein the first PMCH identifier is used to indicate the number of PRB pairs or physical RBGs that are part of the PMCH resource area in a direction from a lowest frequency to a highest frequency of system bandwidth and the number of PRB pairs or physical RBGs that are part of the PMCH resource area in a direction from the highest frequency to the lowest frequency, and wherein the first non-PMCH identifier is used to indicate the number of PRB pairs or RBGs that are part of the non-PMCH resource area in the direction from the lowest frequency to the highest frequency of the system bandwidth and the number of PRB pairs or RBGs that are part of the non-PMCH resource area in the direction from the highest frequency to the lowest frequency.

8. The method according to claim 7, wherein receiving the resource configuration information sent by the base station comprises receiving, by the user equipment, a physical downlink shared channel (PDSCH) sent by the base station, and wherein the PDSCH carries the resource configuration information.

9. The method according to claim 7, wherein the resource configuration information further comprises information indicating the PMCH, and wherein the information indicating the PMCH comprises at least one of the following: a modulation and coding scheme corresponding to the PMCH or an update indicator of a multicast control channel (MCCH) corresponding to the PMCH.

10. The method according to claim 9, wherein before receiving the PDSCH sent by the base station, the method further comprises receiving, by the user equipment, RRC signaling or an enhanced physical downlink control channel (EPDCCH) sent by the base station, wherein the RRC signaling or the EPDCCH carries information about the PDSCH, and wherein the information about the PDSCH comprises at least one of the following:

a time resource and a frequency resource occupied by the PDSCH; or a modulation and coding scheme.

11. The method according to claim 7, wherein the physical downlink channel comprises one or more of the following channels: a physical downlink shared channel (PDSCH) for transmitting downlink data, a channel for transmitting a hybrid automatic repeat request indicator, or a physical downlink control channel (PDCCH) for transmitting a downlink control signal.

12. The method according to claim 7, wherein receiving the resource configuration information sent by the base station comprises receiving, by the user equipment, radio resource control (RRC) signaling, a master information block (MIB), or a system information block (SIB) sent by the base station, and wherein the RRC signaling, the MIB, or the SIB carries the resource configuration information.

13. A base station comprising:

a processor configured to determine a physical multicast channel (PMCH) resource area and a non-PMCH resource area in a frequency domain resource of a data frame used for transmitting a multicast or broadcast signal, wherein the PMCH resource area is used to transmit a PMCH, and the non-PMCH resource area is used to transmit a physical downlink channel; and a transmitter configured to send resource configuration information to a user equipment, wherein the resource configuration information comprises a resource identifier corresponding to at least one of the PMCH resource area and/or the non-PMCH resource area, and wherein the resource identifier is used to indicate at least one of the following: a PMCH physical resource block (PRB) pairs number indicating a total number of PRB pairs that are part of the PMCH resource area, a non-PMCH PRB number indicating a total number of PRB pairs that are part of the non-PMCH resource area, a PMCH resource block groups (RBGs) number indicating a total number of RBGs that are part of the PMCH resource area, or a non-PMCH RBGs number indicating a total number of RBGs that are part of the non-PMCH resource area; and wherein the resource identifier that is part of the resource configuration information sent by the transmitter to the user equipment comprises at least one of the following: a first PMCH identifier or a first non-PMCH identifier, wherein the first PMCH identifier is used to indicate the number of PRB pairs or physical RBGs that are part of the PMCH resource area in a direction from a lowest frequency to a highest frequency of system bandwidth and the number of PRB pairs or physical RBGs that are part of the PMCH resource area in a direction from the highest frequency to the lowest frequency, and wherein the first non-PMCH identifier is used to indicate the number of PRB pairs or RBGs that are part of the non-PMCH resource area in the direction from the lowest frequency to the highest frequency of the system bandwidth and the number of PRB pairs or RBGs that are part of the non-PMCH resource area in the direction from the highest frequency to the lowest frequency.

14. The base station according to claim 13, wherein the transmitter being configured to send the resource configuration information to the user equipment comprises the transmitter being configured to:

add the resource configuration information to a physical downlink shared channel (PDSCH); and send the PDSCH to the user equipment.

15. The base station according to claim 14, wherein the resource configuration information sent by the transmitter to the user equipment further comprises information indicating the PMCH, and wherein the information indicating the PMCH comprises at least one of the following: a modulation and coding scheme corresponding to the PMCH or an update indicator of a multicast control channel (MCCH) corresponding to the PMCH.

16. The base station according to claim 14, wherein before adding the resource configuration information to the PDSCH and sending the PDSCH to the user equipment, the transmitter is configured to:

add information about the PDSCH to radio resource control (RRC) signaling or an enhanced physical downlink control channel (EPDCCH); and send the RRC signaling or the EPDCCH to the user equipment, and wherein the information about the PDSCH comprises at least one of the following:
- a time resource and a frequency resource occupied by the PDSCH; or
- a modulation and coding scheme.

17. The base station according to claim 13, wherein the physical downlink channel comprises one or more of the following channels: a physical downlink shared channel (PDSCH) for transmitting downlink data, a channel for transmitting a hybrid automatic repeat request indicator, or physical downlink control channel (PDCCH) for transmitting a downlink control signal.

18. The base station according to claim 13, wherein the transmitter being configured to send the resource configuration information to the user equipment comprises the transmitter being configured to:
- add the resource configuration information to radio resource control (RRC) signaling, a master information block (MIB), or a system information block (SIB); and
- send the RRC signaling or the MIB or the SIB to the user equipment.

19. A user equipment comprising:
- a receiver configured to receive resource configuration information sent by a base station, wherein the resource configuration information comprises a resource identifier; and
- a processor configured to determine at least one of the following according to the resource identifier: a physical multicast channel (PMCH) resource area or a non-PMCH resource area in a frequency domain resource of a data frame used for transmitting a multicast or broadcast signal,
- wherein the PMCH resource area is used to carry a PMCH, and the non-PMCH resource area is used to carry a physical downlink channel, and
- wherein the resource identifier is used to indicate at least one of the following: a PMCH physical resource block (PRB) pairs number indicating a total number of PRB pairs that are part of the PMCH resource area, a non-PMCH PRB number indicating a total number of PRB pairs that are part of the non-PMCH resource area, a PMCH resource block groups (RBGs) number indicating a total number of RBGs that are part of the PMCH resource area, or a non-PMCH RBGs number indicating a total number of RBGs that are part of the non-PMCH resource area; and
- wherein the resource identifier received by the receiver comprises at least one of the following: a first PMCH identifier or a first non-PMCH identifier, wherein the first PMCH identifier is used to indicate the number of PRB pairs or physical RBGs that are part of the PMCH resource area in a direction from a lowest frequency to a highest frequency of system bandwidth and the number of PRB pairs or physical RBGs that are part of the PMCH resource area in a direction from the highest frequency to the lowest frequency, and wherein the first non-PMCH identifier is used to indicate the number of PRB pairs or RBGs that are part of the non-PMCH resource area in the direction from the lowest frequency to the highest frequency of the system bandwidth and the number of PRB pairs or RBGs that are part of the non-PMCH resource area in the direction from the highest frequency to the lowest frequency.

20. The user equipment according to claim 19, wherein the resource configuration information received by the receiver comprises a physical downlink shared channel (PDSCH), and wherein the PDSCH carries the resource configuration information.

21. The user equipment according to claim 19, wherein the resource configuration information received by the receiver further comprises information indicating the PMCH, and wherein the information indicating the PMCH comprises at least one of the following: a modulation and coding scheme corresponding to the PMCH or an update indicator of a multicast control channel (MCCH) corresponding to the PMCH.

22. The user equipment according to claim 21, wherein before receiving the PDSCH sent by the base station, the receiver is configured to receive RRC signaling or an enhanced physical downlink control channel (EPDCCH) sent by the base station, wherein the RRC signaling or the EPDCCH carries information about the PDSCH, and wherein the information about the PDSCH comprises at least one of the following:
- a time resource and a frequency resource occupied by the PDSCH; or
- a modulation and coding scheme.

23. The user equipment according to claim 19, wherein the physical downlink channel comprises one or more of the following channels: a physical downlink shared channel (PDSCH) for transmitting downlink data, a channel for transmitting a hybrid automatic repeat request indicator, and a physical downlink control channel (PDCCH) for transmitting a downlink control signal.

24. The user equipment according to claim 19, wherein the resource configuration information received by the receiver comprises radio resource control (RRC) signaling, a master information block (MIB), or a system information block (SIB), and wherein the RRC signaling, the MIB, or the SIB carries the resource configuration information.

* * * * *